R. W. RANSDELL.
GREASE RETAINER FOR AUTOMOBILE REAR AXLES.
APPLICATION FILED JUNE 29, 1920.

1,359,428.

Patented Nov. 16, 1920.

INVENTOR.
ROBERT W. RANSDELL.
BY A.B. Bomlaw
ATTORNEY

UNITED STATES PATENT OFFICE.

ROBERT W. RANSDELL, OF SAN DIEGO, CALIFORNIA, ASSIGNOR TO CHARLES H. RUTHERFORD, OF SAN DIEGO, CALIFORNIA.

GREASE-RETAINER FOR AUTOMOBILE REAR AXLES.

1,359,428.  Specification of Letters Patent.  Patented Nov. 16, 1920.

Application filed June 29, 1920. Serial No. 392,763.

*To all whom it may concern:*

Be it known that I, ROBERT W. RANSDELL, a citizen of the United States, residing at San Diego, in the county of San Diego and State of California, have invented certain new and useful Grease-Retainers for Automobile Rear Axles, of which the following is a specification.

My invention relates to grease retainers for preventing the grease from passing from the differential to the main axle bearings and running out on the hub and rear wheels of a vehicle and is more particularly adapted for use in connection with the conventional Ford rear axle, and the objects of my invention are: first, to provide an apparatus to be used between the axle and casing in the rear axle of an automobile for preventing the grease from passing from the differential to the end of the axle; second, to provide an apparatus of this class which will automatically take up the wear and therefore remain tight after considerable usage; third, to provide an apparatus of this class which is applicable for use in connection with the various makes of vehicle axles in use; fourth, to provide a means of packing in which the packing is kept under tension at all times and fifth, to provide an apparatus of this class which is very simple and economical of construction, durable, easy to install and which will not readily deteriorate or get out of order.

Figure 1:
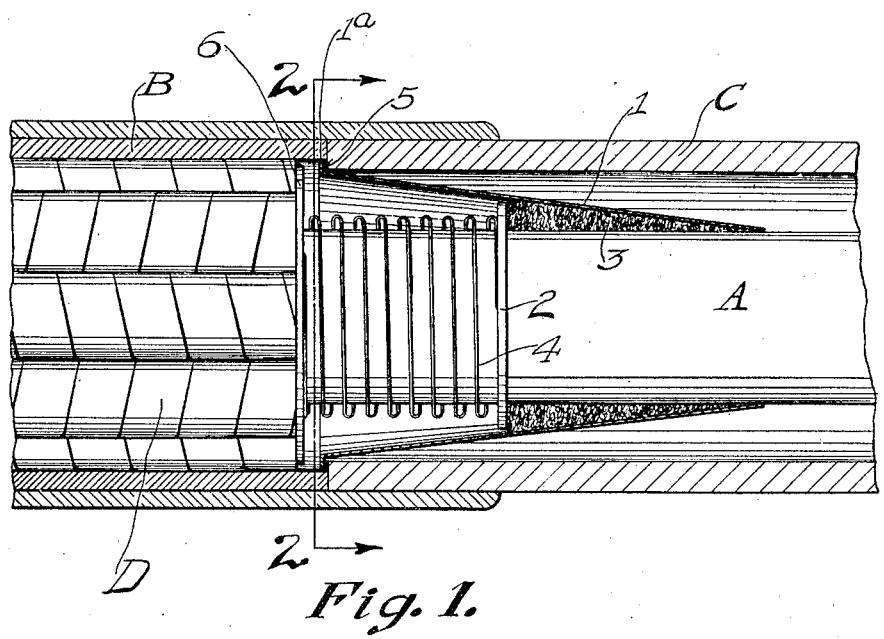
Figure 2:
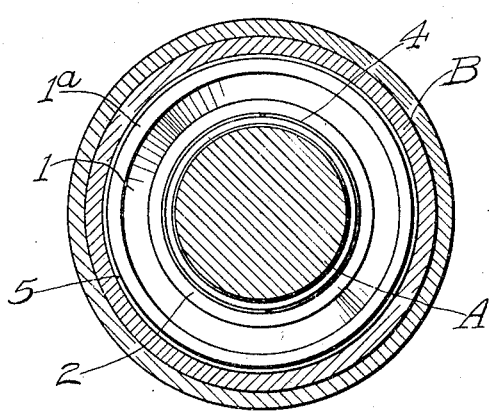

With these and other objects in view as will appear hereinafter my invention consists of certain novel features of construction, combination and arrangement of parts and portions as will be hereinafter described in detail and particularly set forth in the appended claims, reference being had to the accompanying drawings and to the characters of reference thereon which form a part of this application in which:

Figure 1 is a longitudinal, sectional view of a fragmentary portion of a vehicle rear axle and casing and showing my apparatus in position therewith ready for use and Fig. 2 is a sectional view through 2—2 of Fig. 1.

Similar characters of reference refer to similar parts and portions throughout the views of the drawings.

The frusto-conical member 1, washer 2, packing 3, spring 4, packing ring 5 and washer 6 constitute the principal parts and portions of my grease retaining apparatus.

The frusto-conical member 1 is of the proper diameter at its small end to fit snugly around the axle A and its larger end is provided with an outwardly extending flange 1ª which is adapted to rest inside of the main bearing casing B and the flange portion extends past the inner surface of the axle casing C. Positioned between this flange 1ª and the casing C is the packing ring 5. Mounted around the axle A is the washer 6 which is supported against the main bearings D. Also mounted around the axle A is another washer 2 of considerably smaller diameter and adapted to extend into the frusto-conical member 1. Mounted between the washers 6 and 2 is a compression spring 4 which tends to hold the washer 2 into the frusto-conical member 1 and mounted between this washer 2 and between the axle A and the small end of the frusto-conical member 1 is the packing 3. Thus it will be noted that the spring 4 tends to compress the packing in the frusto-conical member 1 making a grease tight joint between the axle A and the small end of the frusto-conical member 1 and also tends to hold the flange portion 1ª of the frusto-conical member 1 against the packing ring 5 at the end of the casing C forming a tight joint around the larger portion of the frusto-conical member 1 by reason of the pressure of the spring against the washer 2 and packing 3.

Though I have shown and described a particular construction, combination and arrangement of parts and portions I do not wish to be limited to this particular construction, combination and arrangement but desire to include in the purview of my invention the construction, combination and arrangement substantially as set forth in the appended claims.

It is obvious that with this construction, there is provided an apparatus for retaining the grease and preventing its passing from the differential to the end of the axle and leaking out in which the spring 4 tends to compress both the packing 3 and 5 thus forming a substantial retainer which automatically will take up the wear and keep the packing tight at all times.

Having thus described my invention what I claim as new and desire to secure by Letters Patent is:

1. A grease retainer of the class described, including a frusto-conical member positioned around the rear axle of a vehicle and provided with a flange on its larger end, packing compressed in the small end, packing positioned between said flange and the end of the axle casing and spring means tending to hold both of said packings compressed.

2. A device of the class described, including a frusto-conical member positioned around the rear axle of a vehicle provided with a flange on its larger end extending past the inner surface of the rear axle casing at one end, packing between said flange and the end of said inner surface of said frusto-conical member near the small end and means tending to compress the packing in the small end of said frusto-conical member whereby the packing between the flange and end of the axle casing is also compressed.

3. A device of the class described, including a frusto-conical member positioned around the rear axle of a vehicle provided with a flange on its larger end extending past the inner surface of the rear axle casing at one end, packing between said flange and the end of said inner surface of said frusto-conical member near the small end, means tending to compress the packing in the small end of said frusto-conical member whereby the packing between the flange and the end of the axle casing is also compressed comprising, a washer shiftably mounted on said axle and a compression spring tending to hold said washer inwardly in said frusto-conical member.

In testimony whereof I have hereunto set my hand at San Diego, California, this 22nd day of June, 1920.

ROBERT W. RANSDELL.